Patented July 21, 1942

2,290,547

UNITED STATES PATENT OFFICE 2,290,547

STYRENE POLYMER

Robert R. Dreisbach, Sylvia M. Stoesser, and Alden W. Hanson, Midland, Mich., assignors to The Dow Chemical Company, Midland, Mich., a corporation of Michigan No Drawing. Application April 9, 1941, Serial No. 387,692

6 Claims. (Cl. 260—80)

This invention concerns the polymerization of vinyl compounds, particularly vinyl aromatic compounds, together with phenylacetylene and certain new products resulting from such polymerization.

In a copending application Serial No. 146,519, filed June 4, 1937, and now Patent No. 2,241,770, of which this application is a continuation-in-part, we have disclosed that phenylacetylene is effective as an agent for stabilizing a variety of vinyl compounds, particularly vinyl aromatic compounds such as styrene, para-chloro-styrene, ortho-methyl-styrene, para-ethyl-styrene, vinyl naphthalene, etc., against polymerization during storage, shipment or other handling of such vinyl compounds. We have also shown that it is especially adapted to use as a stabilizer for styrene, since it distills together with the latter and is effective in preventing polymerization during purification of the styrene by distillation. The copending application also shows procedures whereby the phenylacetylene may readily be removed from solutions thereof in vinyl compounds to recover the latter in purified forms which are readily polymerized to obtain the usual polymers.

We have found that although phenylacetylene is effective as an agent for retarding the polymerization of vinyl compounds both at ordinary and elevated temperatures, the polymerization may be carried out by prolonged heating of the solutions to obtain valuable polymeric products which have properties entirely distinct from those of the polymers obtained by polymerizing the same vinyl compounds in the absence of phenylacetylene under otherwise similar conditions. The polymeric products obtained by polymerizing vinyl compounds, particularly vinyl aromatic compounds, in the presence of phenylacetylene are of considerably lower molecular weight, but often of about the same impact strength, as the polymers obtained by polymerizing the vinyl compounds alone under conditions which are otherwise similar.

The rate of reaction and also the molecular weight and the properties of the polymerization products vary with changes in the proportion of phenylacetylene in the reaction mixture. In general, the polymerization occurs more slowly and the molecular weight and hardness of the products are lowered as the proportion of phenylacetylene is increased. In any instance, the rate of polymerization may, of course, be increased by the use of polymerization catalysts such as actinic light and/or peroxides such as benzoyl peroxide, peracetic acid, etc.

The products obtained by polymerizing vinyl compounds in the presence of phenylacetylene vary in physical state from viscous liquids to solid thermoplastic resins. All of such products are useful as dielectric agents, the products obtained by polymerizing vinyl aromatic compounds together with phenylacetylene being particularly valuable for such purpose. The solid resinous products may also be used in making molded articles or as ingredients of lacquers or other coating compositions.

The resinous products have the added advantage that, due to their lower molecular weight, they may be incorporated in larger amounts in solvents to yield solutions of a given viscosity than would be possible with polymers formed under otherwise similar conditions from the same vinyl compounds alone. This is of importance, since it permits the preparation of lacquers of desired viscosity which possess a high content of dissolved solids, e. g. the resin, and which are exceptionally quick drying.

In practicing the invention a polymerizable unsaturated organic compound such as styrene, in which phenylacetylene is dissolved, is caused to undergo polymerization. This is usually accomplished by heating either with or without the addition of an agent which promotes polymerization. It is not necessary that the phenylacetylene be added to the styrene or other polymerizable organic compound immediately before polymerization, since it may conveniently be employed to inhibit polymerization of styrene and the like during storage or processing, e. g. distillation, after which polymerization may be caused to take place without separating the phenylacetylene. Phenylacetylene is used in minor proportions, usually in amounts less than 10 per cent and preferably between 0.01 per cent and 5.0 per cent. The polymerization is ordinarily carried out at temperatures between 100° C. and 225° C. but it may, though less satisfactorily, be carried out at lower or higher temperatures. Under otherwise similar conditions a rise in the reaction temperature results in more rapid polymerization, but in a lowering of the molecular weight of the polymeric product.

The following table gives the average molecular weight and the Rockwell hardness of a number of resinous products prepared by heating styrene alone or in admixture with phenylacetylene at a temperature of 125° C. for 48 hours. The table also states the per cent by weight of phenylacetylene in each composition subjected to such treatment.

Table

| Percent phenylacetylene in styrene employed | Properties of polymer | |
|---|---|---|
| | Molecular weight | Hardness |
| 0 | 101,700 | 130 |
| 0.03 | 87,700 | 104 |
| 0.15 | 69,400 | 73 |
| 0.30 | 65,900 | 45 |
| 0.60 | 43,500 | Viscous liquid |
| 3.00 | 28,200 | Viscous liquid |

The resinous products prepared from the solutions of phenylacetylene in styrene were colorless, transparent substances having excellent dielectric properties.

Although the foregoing description of the invention has for sake of clarity been limited to the polymerization of styrene by treating the latter with phenylacetylene, other polymerizable unsaturated organic compounds, such as vinyl acetate, para-chloro-styrene, para-methyl-styrene, vinyl-ethyl-benzene, divinyl benzene, vinyl naphthalene, etc., may be similarly polymerized with phenyl-acetylene.

Other modes of applying the principle of the invention may be employed instead of those explained, change being made as regards the method or compounds herein disclosed, provided the steps or compounds stated by any of the following claims or the equivalent of such stated steps or compounds be employed.

We therefore particularly point out and distinctly claim as our invention:

1. A polymeric product prepared by prolonged heating of a mixture of a vinyl aromatic compound and phenylacetylene in amount less than 10 per cent by weight of the mixture at temperatures between 100° and 225° C.

2. A synthetic resin prepared by prolonged heating of a mixture of styrene and phenylacetylene in amount less than 5 per cent by weight of the mixture at temperatures between 100° and 225° C.

3. In a method of making a synthetic resin, the step which consists in heating a mixture of a vinyl aromatic compound and phenylacetylene in amount less than 10 per cent by weight of the mixture at temperatures between 100° and 225° C. to effect polymerization.

4. In a method of making a synthetic resin, the step which consists in heating a mixture of styrene and phenylacetylene in amount less than 5 per cent by weight of the mixture at temperatures between 100° and 225° C. to effect polymerization.

5. In a method of polymerizing vinyl aromatic compounds, the step of depressing the molecular weight of the polymeric product by carrying out the polymerization at temperatures between 100° and 225° C. in the presence of phenylacetylene in amount less than 10 per cent by weight of the mixture.

6. In a method of polymerizing styrene, the step of depressing the molecular weight of the polymeric product by carrying out the polymerization at temperatures between 100° and 225° C. in the presence of phenylacetylene in amount less than 5 per cent by weight of the mixture.

ROBERT R. DREISBACH.
SYLVIA M. STOESSER.
ALDEN W. HANSON.